3,536,754
MANUFACTURE OF OXALIC ACID
Gerhard H. Fuchs, Tewksbury Township, Hunterdon, and William E. Watson, Mount Tabor, N.J., assignors to Allied Chemical Corporation, New York, N.Y., a corporation of New York
Filed Jan. 24, 1968, Ser. No. 700,246
Int. Cl. C07c 55/04, 55/06
U.S. Cl. 260—528                                          8 Claims

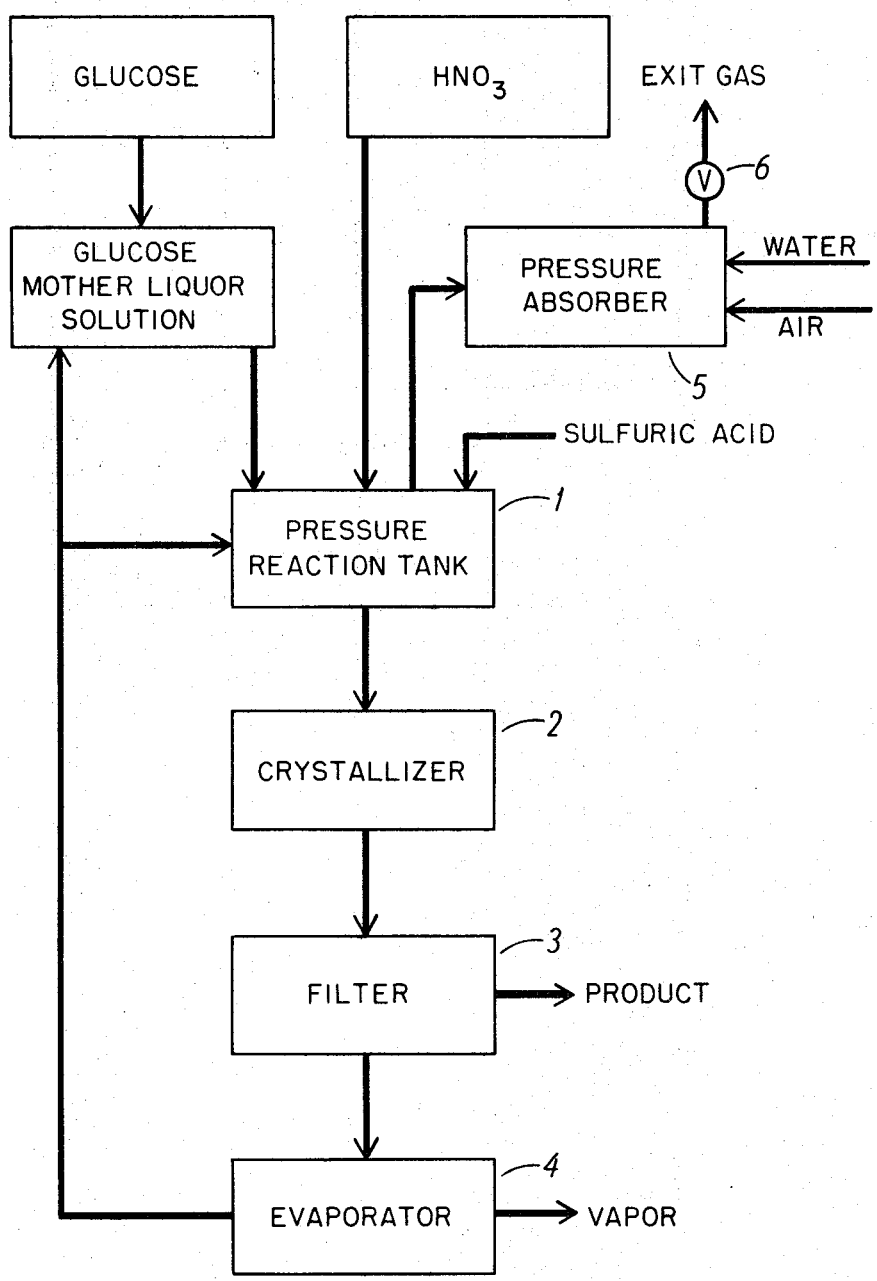

ABSTRACT OF THE DISCLOSURE

In the process for making oxalic acid by oxidizing carbohydrates with nitric acid and recovering nitric oxides formed in the oxidation as nitric acid, nitric acid recovery is improved, and corrosion of reaction vessels is reduced, by an improvement which comprises, in combination, oxidizing the carbohydrate, under exclusion of free oxygen, and recovering the nitric oxides, in the presence of free oxygen, under superatmospheric pressure of at least about 50 p.s.i.g. in pressure reaction vessels associated with a nitric acid pressure absorption system.

BACKGROUND OF THE INVENTION

This invention relates to an improvement in a process for the manufacture of oxalic acid by catalyzed oxidation of carbohydrates with nitric acid and recovery, as nitric acid, of oxides of nitrogen formed in the reaction.

Oxidation of carbohydrates such as glucose, sucrose, starch, dextrine, cellulose and the like with nitric acid to form oxalic acid is an old, well-known process. For many years its commercial utilization was impeded by low yields, difficulties in control of the reaction, and high cost of recovery of oxides of nitrogen formed in the reaction.

Major contributions toward solution of yield and reaction control problems were made by Simpson, as disclosed in U.S. Pat. 2,057,199, and Brooks, as disclosed in U.S. Pat. 2,322,915. The patent to Simpson describes a method for manufacturing oxalic acid by oxidation of carbohydrates, such as glucose, with nitric acid in the presence of sulfuric acid and a vanadium salt as catalyst at temperatures between about 150° F. and 160° F. while maintaining the carbohydrate in excess of the nitric acid during the oxidation. The process of Simpson is readily controlled and gives oxalic acid in good yield. Better yields yet are obtained by the process of Brooks which employs mixed vanadium-ferric iron catalysts under process conditions similar to those disclosed by Simpson.

While some of the problems attending commercial utilization of the process for making oxalic acid by oxidation of carbohydrates with nitric acid have found a solution, other problems remain unsolved. Outstanding among those are economic recovery of the oxides of nitrogen produced in the reaction, and excessive corrosion of reaction vessels.

In the process of oxidizing carbohydrates with nitric acid to form oxalic acid the nitric acid is reduced to various lower oxides of nitrogen which, for economic operation and to avoid prblems of air pollution, must be recovered. This is commonly done by absorbing these oxides at essentially atmospheric pressure in known manner in the presence of free oxygen in water or weak nitric acid to form nitric acid. However, due to the relatively large amount of lower oxides of nitrogen formed in the carbohydrate oxidation reaction, complex nitric acid recovery systems of considerable size, employing a plurality of absorption towers are required for efficient nitric acid recovery. Nitric acid recovery systems of that type are costly in construction, and are difficult and expensive to operate.

Various means have been proposed to cope with these problems of recovery of the lower oxides of nitrogen. So, for instance, to reduce the amount of oxides of nitrogen given off from the reaction mass it has been proposed to introduce air or oxygen directly into the reaction mass wherein the carbohydrates are oxidized with nitric acid and to maintain the reaction mass under pressures between about 5 to 25 p.s.i.g. by controlled addition of air or oxygen, whereby much of the nitric oxide is regenerated, in the reaction mass, to higher oxides of nitrogen, and consequently to nitrous or nitric acids to react with more carbohydrates. This method, however, poses practical problems with respect to temperature control within the reaction mass and leads to excessive corrosion of the reaction vessels.

Simpson in U.S. Pat. 2,057,119 discloses that in the oxidation of carbohydrates with nitric acid optimum yields are obtained only when reaction temperature is rigidly controlled within narrow limits, whereby dangerous side reactions responsible for reduced yields are avoided. The oxidation reaction of carbohydrates with nitric acid is highly exothermic; large amounts of heat are generated, particularly in the earlier stages of the reaction, and must be dissipated to maintain the reaction mass within desired temperature limits. Even momentary loss of temperature control, particularly in the earlier stages of the reaction, is known to result in sudden uncontrollable violent temperature rises with concomitant violent gas evolution. Since oxidation of lower oxides of nitrogen to higher oxides of nitrogen is also an exothermic reaction, regeneration of lower oxides of nitrogen directly within the reaction mass places an additional burden on the reaction temperature control system, makes effective temperature control more difficult yet, and greatly increases the potential danger of the reaction.

Regeneration of lower oxides of nitrogen directing within the reaction mass by introduction of air or oxygen further leads to severe corrosion problems within the reactor in the area of the liquid-gas interphase.

It is also known that absorption of oxides of nitrogen in water or weak nitric acid to form nitric acid is facilitated by employment of superatmospheric pressure, that the absorber volume required to recover a given volume of oxides of nitrogen within a given amount of time drastically decreases with increasing absorption pressure, and that the absorption of oxides of nitrogen in water or weak nitric acid under superatmospheric pressure allows recovery of a nitric acid product of higher strength than that obtainable by absorption under substantially atmospheric pressure. Unfortunately, however, there are no known economic means for bringing oxides of nitrogen formed in the oxidation of carbohydrates with nitric acid to pressures of significant magnitude, say above about 50 p.s.i.g., to allow their recovery as nitric acid in absorption systems under superatmospheric pressure. On the one hand, commercially available gas compressors cannot economically compress corrosive gases which are laden with acid mist and moisture, as are gases given off from that oxidation reaction, to pressures of that order. On the other hand, the art has taught that, when conducted under superatmospheric pressure, the oxidation of carbohydrates with nitric acid gives reduced yields of oxalic acid, and that oxalic acid yields are improved by conducting the oxidation reaction under reduced pressure.

Accordingly, it is an object of the present invention to provide an improvement in a process for the manufacture of oxalic acid by catalyzed oxidation of carbohydrates with nitric acid which allows recovery of oxides of nitrogen formed in the reaction as nitric acid in a nitric acid pressure absorption system without adversely affecting the oxalic acid yield and while avoiding the need for mechanical compression of these oxides of nitrogen.

It is another object of the present invention to provide an improvement in a process for the manufacture of oxalic acid by catalyzed oxidation of carbohydrates with nitric acid under superatmospheric pressures resulting in facilitated control of reaction temperatures.

It is a further object of the present invention to provide an improvement in a process for the manufacture of oxalic acid by catalyzed oxidation of carbohydrates with nitric acid resulting in reduced corrosion of the reaction vessels.

Other objects will become apparent from the following description and claims.

SUMMARY OF THE INVENTION

In accordance with the present invention the above-stated objectives are attained in an improved method for preparing oxalic acid by oxidation of carbohydrates with nitric acid in a liquid reaction mass comprising sulfuric acid and a catalyst, under certain hereinafter stated conditions, and recovering oxides of nitrogen formed in the reaction as nitric acid in an associated nitric acid recovery system, wherein the improvement comprises, in combination, (a) conducting the oxidation of the carbohydrates with nitric acid in closed pressure reaction vessels under exclusion of free oxygen under superatmospheric pressure of at least about 50 p.s.i.g., and (b) recovering oxides of nitrogen formed in the reaction by absorption in water or weak nitric acid in the presence of free oxygen under superatmospheric pressure of at least 50 p.s.i.g. in pressure absorption systems associated with said closed pressure reaction vessels.

That the oxidation of carbohydrates with nitric acid, under certain conditions, can be conducted under superatmospheric pressure without adverse effect on oxalic acid yield is entirely unexpected because it has long been believed that this process, if conducted under pressure, would give reduced yields of oxalic acid. In British Pat. 510,057, it is stated that presence of nitrogen oxide in the reaction liquor reduces the yield of oxalic acid, and that yields are improved by eliminating nitric oxides from the reaction liquor, as by carrying out the process under reduced pressure. In the oxidation of carbohydrates with nitric acid in a liquid medium some of the oxides of nitrogen evolved in the reaction remain dissolved in the reaction liquor. According to Henry's law, solubility of a gas in a liquid is proportional to the partial pressure of the gas above the liquid. Hence, the higher the pressure under which the oxidation of carbohydrates with nitric acid is conducted, the larger the amount of oxides of nitrogen dissolved in the reaction liquor, and the lower one would expect the yield of oxalic acid to be.

Particularly fortuitous is the discovery that under the conditions of the improved process of this invention internal corrosion of the reaction vessels is substantially reduced, because corrosion of vessels designed for operation under superatmospheric pressure such as are required for the practice of the process of the present invention could cause explosive failure of these vessels. We have found that internal corrosion of reaction vessels employed in the oxidation of carbohydrates with nitric acid in the presence of free oxygen is due to alternate exposure of the inner surface of these vessels to the hot corrosive gas phase and the relatively cooler liquid phase. When the oxidation of the carbohydrates with nitric acid is conducted in the presence of free oxygen, whether under atmospheric or superatmospheric pressure, lower oxides of nitrogen given off from the reaction mass are oxidized to higher oxides of nitrogen in the gas phase thereabove. As the result of that gas phase oxidation, the gas phase will attain a temperature substantially above that of the liquid reaction mass. So, for instance, we have observed that in carbohydrate oxidation reactions under substantially atmospheric pressure, oxidation of lower oxides of nitrogen in the gas phase above the liquid reaction mass by introduction of air into the gas phase results in temperature differentials between liquid and gas phase in the order of about 150° F. Operation under superatmospheric pressures in the presence of free oxygen will result in higher temperature differentials yet, greatly aggravating the corrosion problem. We have found that by excluding free oxygen from the reaction mass and the gas phase thereabove liquid and gas phase are maintained at substantially equal temperatures and internal corrosion of the reaction vessels is substantially reduced.

We have further found that by exclusion of free oxygen from the reaction mass so that lower oxides of nitrogen are not regenerated directly within the reaction mass to higher oxides of nitrogen, temperature control of the reaction mass is greatly facilitated and the potential dangers of the reaction are minimized.

BRIEF DESCRIPTION OF THE DRAWING

The accompanying drawing shows a flow sheet illustrating diagrammatically the process steps involved and apparatus employed in the practice of the improved method of the present invention.

DESCRIPTION OF THE PREFERRED EMBODIMENTS

The oxidation of the carbohydrates with nitric acid in accordance with the present invention may be carried out in any suitable type of pressure reaction vessel capable of withstanding chosen reaction pressures and constructed of corrosion resistant material, such as stainless steel. Reaction vessels are preferably equipped with means for thorough agitation of the reaction mass, and must be equipped with means for feeding controlled amounts of nitric acid and with means for heating and cooling reactor contents. The reaction vessels have a gas outlet connected to the gas inlet of nitric acid pressure absorption equipment of conventional design and function. Design of the equipment required for the practice of the present invention is conventional and is within the skill of the art, and is not part of our invention. Suitable apparatus for absorption of oxides of nitrogen under superatmospheric pressure to form nitric acid, and its operation, are, for example, described in U.S. Pat. 1,708,685 to Taylor, U.S. Pat. 1,735,342 to Taylor et al., and U.S. Pat. 1,840,063 to Taylor.

In operation, the gases evolved in the oxidation reaction pressurize the reaction vessel and the pressure absorption system associated therewith, and effect gas flow through the pressure absorption system. Pressure within the reactor-absorber system may be controlled by bleeding controlled amounts of gas from the exit of the pressure absorber.

The oxidation reaction, and the recovery of the oxides of nitrogen formed in the reaction, are conducted under super-atmospheric pressure of at least about 50 p.s.i.g., suitably between about 50 p.s.i.g. and about 200 p.s.i.g. Preferred reaction and absorption pressures range between about 75 p.s.i.g. and about 150 p.s.i.g. Pressures below about 50 p.s.i.g. afford no significant reduction in the size of the required absorption system, whereas at pressures above about 200 p.s.i.g. the cost of the equipment required for operation at pressures of that order tends to outweigh the benefits of greater efficiencies in nitric acid recovery.

The oxidation of carbohydrates with nitric acid in accordance with the improved process of the present invention is conducted in a liquid reaction mass comprising sulfuric acid and a catalyst. The carbohydrate employed is preferably a monosaccharide, such as glucose, fructose, and the like, although other carbohydrates such as sucrose, starch, dextrine, cellulose, and the like may also be employed. However, when employing carbohydrates of higher molecular weight than that of monosaccharides, it is preferable to hydorylze them with a suitable acid such as, for example, oxalic or sulfuric acid, or the reaction mother liquor of the present process, to form monosaccharides before subjecting them to oxidation with nitric acid.

The nitric acid employed in the improved process of this invention may be of any suitable concentration, varying, for example, from about 60% to about 99% $HNO_3$, the higher concentrations being preferred to avoid excessive dilution of reaction liquors.

The oxidation reaction is carried out in the presence of sulfuric acid. The concentration of sulfuric acid in the reaction mass may vary somewhat, but it is preferable to adjust the sulfuric acid concentration so that the mother liquor, before addition of the carbohydrate, contains about 50% of sulfuric acid, since if the sulfuric acid concentration is permitted to fall material below this value the oxalic acid tends to be oxidized to carbon dioxide, thus reducing the yield of the product The catalyst employed may be a vanadium catalyst or a mixed vanadium-ferric iron catalyst. The vanadium catalyst may be incorporated in the reaction mass by dissolving a vanadium compound therein. The vanadium-ferric iron catalyst may be formed by dissolving suitable vanadium and iron compounds in the acid reaction mixture. The vanadium is preferably derived from vanadium pentoxide, whereas iron may be incorporated in the reaction mixture by dissolving iron, iron oxide, or other soluble iron compounds in the acid medium.

For optimum oxalic acid yields the catalyst concentration is critical. The concentration of vanadium, expressed as $V_2O_5$, whether used alone or in admixture together with ferric iron, required for obtainment of high yields is between about 0.001% to about 0.05%. Preferred vanadium concentration, on the same basis, is between about 0.001 to about 0.002%. Better yields yet are obtained by use of mixed vanadium-ferric iron catalysts, in which case the amount of ferric iron within the reaction mass is controlled between about 0.1% to an amount not greater than required to produce a saturated solution of iron salts in the oxidation mass at room temperature. Preferred ferric iron concentrations range between about 0.3% and about 0.8%.

The temperature of the reaction mass during the oxidation reaction is extremely critical and must be rigidly controlled within narrow limits of between about 145° F. and about 185° F., more preferably between about 155° F. and about 175° F. At temperatures below about 145° F. the reaction proceeds too slow for commercial utilization; at temperatures above about 185° F. yield of oxalic acid tends to decline drastically. Most preferred reaction temperatures range between about 160° F. and about 175° F. No matter what the chosen reaction temperature, the mass in the reaction vessel should be initially heated to a temperature of preferably not less than about 150° F. before addition of nitric acid.

An important element in the process involves control of conditions in the reaction mass during oxidation so as to avoid a material excess of nitric acid, and so that there is maintained an excess of carbohydrate in the reaction mixture.

The procedure involved in the preferred embodiment of the improved process of the present invention, which may be carried out continuously or batchwise, may be more clearly understood from the following specific description making reference to the accompanying drawing showing a flow sheet, illustrating diagrammatically apparatus employed.

In the preferred embodiment of the practice of the improved process of the present invention, oxalic acid mother liquor from a previous operation, from which oxalic crystals have been removed and which contains about 50% sulfuric acid by weight, is run into pressure reaction tank 1 designed for operation at superatmospheric pressure. Associated with pressure reaction tank 1 is pressure absorber 5 suitable for recovery of oxides of nitrogen in the form of nitric acid under superatmospheric pressure. The motor liquor should contain dissolved therein the vanadium or mixed vanadium-ferric iron catalyst in the above stated concentrations. If necessary, sufficient iron and/or vanadium, in the form of vanadium pentoxide, may be dissolved in the motor liquor to adjust the catalyst concentration thereof within the desired ranges, and sulfuric acid may be added to make up for losses of sulfuric acid in the previous batch. A previously prepared solution of the carbohydrate e.g. glucose, in mother liquor is added to the mother liquor in pressure reaction tank 1. The tank is sealed, and the mass is heated to between about 150° F. and about 165° F. Nitric acid is then introduced into the mass while maintaining the temperature thereof within the above stated ranges. The oxides of nitrogen formed in the reaction by reduction of the nitric acid pressurize pressure reaction tank 1 and pressure absorber 5 associated therewith. Pressure in tank 1, and pressure absorber 5, is controlled by bleeding controlled amounts of exit gases from pressure absorber 5 through control valve 6. Air or oxygen in amount required for oxidation of the lower oxides of nitrogen given off from the reaction mass to higher oxides of nitrogen recoverable as nitric acid is introduced either directly in pressure absorber 5, or at a point located between pressure reaction tank 1 and pressure absorber 5, but not in tank 1. Upon conclusion of the oxidation reaction, indicated by gradual buildup of nitric acid concentration within the reaction mass, oxides of nitrogen remaining dissolved in the reaction mass may, if desired, be dispelled therefrom by bubbling air through the mass for a short time. When the reaction has proceeded to completion the reaction mass is transferred to crystallizer 2 wherein it is permitted to cool. The oxalic acid which crystallizes from the reaction mass upon cooling is removed by filtration in filter 3. The effluent from filter 3, if required, is brought to desired concentration by evaporation of water therefrom in evaporator 4 and is then recycled and employed as mother liquor as hereinabove described.

If desired, the crystallized oxalic acid so obtained may be purified by recrystallization from an aqueous medium, and the mother liquors from the recrystallization step, containing small amounts of oxalic acid together with sulfuric acid and other impurities, may, if desired, be concentrated by evaporation of water therefrom and be added to the mother liquor employed in the oxidation step.

When starting out operations, a suitable mother liquor for the oxidation step may be prepared by mixing water, sulfuric acid, and vanadium and iron compounds in proportions required to obtain a liquor containing constituents in concentrations stated above.

The following examples wherein parts and percentages are by weight illustrate corresponding yields obtained when hydrolyzed starch is oxidized to oxalic acid with nitric acid under the process conditions of the present invention and under atmospheric pressure, but otherwise equal conditions.

EXAMPLE I 220 parts of raw starch (containing about 85.6% starch) were added to 1,840 parts of oxalic acid mother liquor recovered from a previous operation and containing about 49.5% sulfuric acid, 4.4% oxalic acid, 0.4% ferric iron, and 0.00112% vanadium (expressed as $V_2O_5$). This mixture was heated to about 150° F. and was stirred for about 1 hour to obtain a uniform liquid mass. This liquid mass was placed in a stainless steel pressure reactor equipped with an agitator, a thermometer, and heating and cooling means. The reactor was sealed, the liquid mass in the reactor was heated to 160° F., and 775 parts of 63% nitric acid were gradually added thereto over a period of 4½ hours. Throughout that period the liquid mass in the pressure reactor was maintained at a temperature between 160° F. and 165° F. Internal pressure within the pressure reactor was allowed to rise to 150 p.s.i.g. and was maintained at that level throughout the period of nitric acid addition by bleeding controlled amounts of the gases formed in the oxidation reaction from the pressure reactor. Upon completion of the reaction the liquid mass was withdrawn from the reactor and was allowed to cool to room temperature (ca. 20° C.), and the oxalic acid crystals which formed were separated from the mother liquor. The yield of oxalic acid amounted to 1.615 parts of oxalic acid per part of starch.

EXAMPLE II 200 parts of raw starch (containing about 85.6° starch) were added to 1,630 parts of oxalic acid mother liquor recovered from a previous operation and containing about 49% sulfuric acid, 7.4% oxalic acid, 0.4% ferric iron, and 0.0012% vanadium (expressed as $V_2O_5$). This mixture was heated to about 150° F. and was stirred for about 1 hour to obtain a uniform liquid mass. This liquid mass was placed in the stainless steel reactor employed in Example I, the mass in the reactor was heated to 155° F., and 845 parts of 63% nitric acid were gradually added over a period of 4½ hours. Temperature of the liquid mass rose to 165° F. and was maintained at that level throughout the period of nitric acid addition. The oxidation reaction was run under atmospheric pressure throughout. Upon completion of the reaction, the liquid mass was withdrawn from the reactor and was allowed to cool to room temperature (ca. 20° C.) and the oxalic acid crystals which formed were separated from the mother liquor. The yield of oxalic acid amounted to 1.625 parts of oxalic acid per part of starch.

Comparative yields of oxalic acid obtained in repeated runs under superatmospheric pressure of 150 p.s.i.g. under the conditions of Example I, and under atmospheric pressure under the conditions of Example II, are summarized in the table below.

TABLE

| | Yield of oxalic acid (parts of oxalic acid per part of starch) | |
|---|---|---|
| | Reaction pressure, atmospheric | Reaction pressure, 150 p.s.i.g. |
| Run: | | |
| 1 | 1.625 | 1.615 |
| 2 | 1.600 | 1.605 |
| 3 | 1.650 | 1.618 |
| 4 | | 1.650 |
| Average yield | 1.625 | 1.622 |

Equivalent results are obtained when other carbohydrates within the purview of the present invention are oxidized to oxalic acid with nitric acid under the process conditions of the above examples.

These examples and the results shown in the table above clearly demonstrate that under specific process conditions oxidation of carbohydrates with nitric acid to form oxalic acid may be conducted under superatmospheric pressure without adverse effect on yield of oxalic acid, whereby oxides of nitrogen evolved in the reaction are obtained at superatmospheric pressures suitable for recovery in nitric acid pressure absorption systems, so that the benefits accruing from absorption of oxides of nitrogen under pressure can be realized without the need for use of gas compressors and without sacrifice of yield of oxalic acid.

This invention may be embodied in other forms or carried out in other ways without departing from the spirit or essential characteristics thereof. The present embodiments are therefore to be considered in all respects as illustrative and not restrictive, the scope of the invention being indicated by the appended claims.

What is claimed is:
1. In a method for preparing oxalic acid by reacting a carobohydrate with nitric acid in a liquid reaction mass comprising sulfuric acid and a catalyst, at temperatures between about 145° F. and about 185° F., while maintaining the carbohydrate in the reaction mass in excess of the nitric acid during the reaction, permitting the reaction mass to cool whereby oxalic acid crystallizes therefrom, separating the oxalic acid from the cooled mass, recycling the liquid portion of the cooled reaction mass, and recovering oxides of nitrogen formed in the reaction as nitric acid in an associated nitric acid absorption system in the presence of free oxygen, the improvement which comprises, in combination;
   (a) conducting the reaction of the carbohydrate with the nitric acid under exclusion of free oxygen, and
   (b) conducting the reaction of the carbohydrate with the nitric acid and the recovery of oxides of nitrogen formed in the reaction under superatmospheric pressure of at least about 50 p.s.i.g.
2. The method of claim 1 wherein the catalyst is a vanadium-ferric iron catalyst.
3. The method of claim 2 wherein the reaction of the carbohydrate with the nitric acid is conducted at temperatures between about 155° F. and about 175° F.
4. The method of claim 3 wherein the reaction of the carbohydrate with the nitric acid is conducted in the presence of vanadium in amount between about 0.001% to about 0.05% (expressed as $V_2O_5$), and in the presence of ferric iron in amount between about 0.1% to an amount not greater than required to produce a saturated solution of iron salts in the oxidation mass at room temperature.
5. The method of claim 4 wherein the reaction of the carbohydrate with the nitric acid and the recovery of oxides of nitrogen are conducted at superatmospheric pressure between about 50 p.s.i.g. and about 200 p.s.i.g.
6. The method of claim 4 wherein the reaction of the carbohydrate with the nitric acid and the recovery of the oxides of nitrogen are conducted at superatmospheric pressure between about 50 p.s.i.g. and about 150 p.s.i.g.
7. The method of claim 6 wherein the reaction of the carbohydrate with the nitric acid is conducted at temperatures between about 160° F. and about 175° F.
8. The method of claim 7 wherein the reaction of the carbohydrate with the nitric acid is conducted in the presence of vanadium in amount between about 0.001% to about 0.02% (expressed as $V_2O_5$) and in the presence of ferric iron in amount between about 0.3% and about 0.8%.

References Cited

UNITED STATES PATENTS 2,057,119   10/1936   Simpson _____ 260—528

JAMES A. PATTERN, Primary Examiner